United States Patent [19]
Neighbors et al.

[11] Patent Number: 6,079,895
[45] Date of Patent: Jun. 27, 2000

[54] CABLE SPLICE

[75] Inventors: Christopher Alan Neighbors, Alvin; Mike Maples, Houston, both of Tex.

[73] Assignee: Syntron, Inc., Houston, Tex.

[21] Appl. No.: 09/156,699

[22] Filed: Sep. 18, 1998

[51] Int. Cl.[7] .................................................. B25G 3/12
[52] U.S. Cl. ....................... 403/305; 403/267; 403/374.3; 24/122.6
[58] Field of Search ................................. 403/307, 305, 403/300, 301, 275, 268, 267, 370, 374.3, 374.1, 368; 24/115 N, 215 EE, 135 R, 122.6

[56] References Cited

U.S. PATENT DOCUMENTS

| | | | |
|---|---|---|---|
| 1,188,054 | 6/1916 | Faile | 403/275 |
| 1,824,005 | 9/1931 | Astley | 403/275 |
| 1,885,316 | 11/1932 | Astley | 403/275 |
| 3,573,346 | 4/1971 | Appledby | 403/267 |
| 3,660,887 | 5/1972 | Davis | 403/267 |
| 5,154,532 | 10/1992 | Schaefer et al. | 403/301 |
| 5,431,507 | 7/1995 | Smilanick | 403/307 |
| 5,626,054 | 5/1997 | Rembert et al. | 403/305 |
| 5,729,952 | 3/1998 | Dahl | 403/305 |

*Primary Examiner*—Terry Lee Melius
*Assistant Examiner*—Kenneth Thompson
*Attorney, Agent, or Firm*—Felsman, Bradley, Vaden, Gunter & Dillon, LLP

[57] ABSTRACT

A device for joining the parted ends of a rope member is provided. The device comprises blocks that are epoxied to the ends of the rope member and a threaded sleeve to thread onto one of the blocks. The invention also provides a method of joining the parted ends of a rope member including the steps of epoxying a block to each end to be joined to form a splice and coupling a threaded sleeve to one of the blocks while securing the other block within the sleeve.

10 Claims, 2 Drawing Sheets

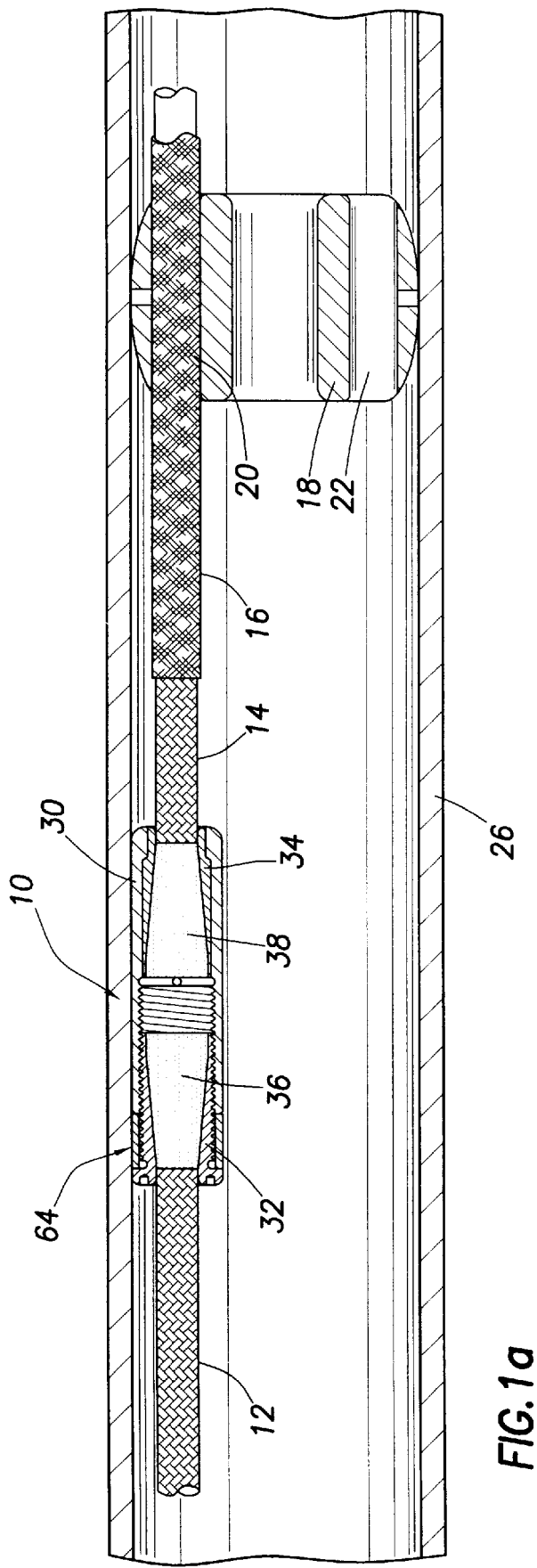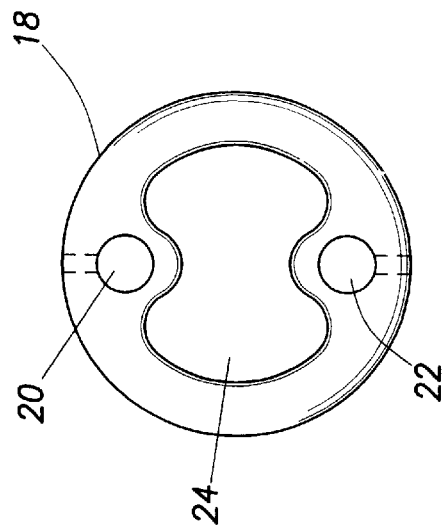
FIG.1a
FIG.1b

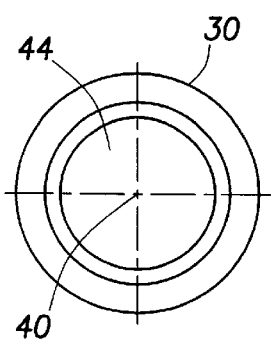
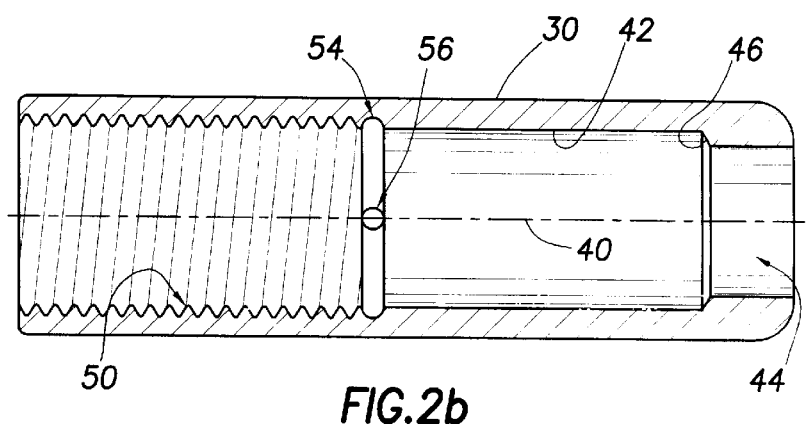
FIG.2a  FIG.2b
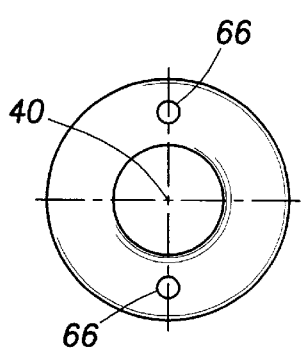
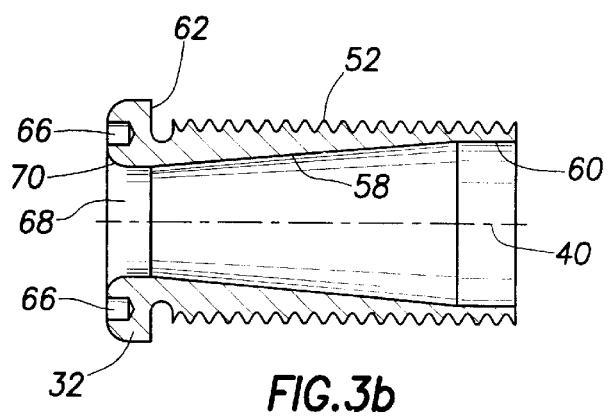
FIG.3a  FIG.3b
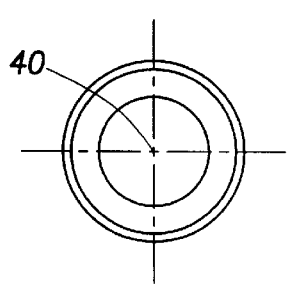
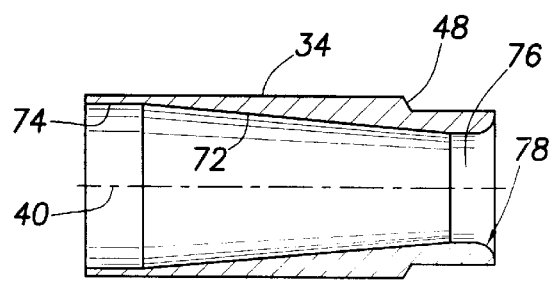
FIG.4a  FIG.4b

CABLE SPLICE

FIELD OF THE INVENTION

The present invention relates generally to the field of load bearing cables and, more particularly, to a method and device for the repair of a damaged load bearing cable in a seismic streamer.

BACKGROUND OF THE INVENTION

Seismic exploration commonly involves towing a marine seismic streamer behind a vessel. The seismic streamer is in the form of a series of hydrophone elements strung together within a surrounding tube or jacket. The hydrophone elements are joined by conductors for carrying data and command signals between connectors at the ends of segments of the streamer.

In the environment of seismic exploration, many segments are connected together to make the streamer array that is kilometers long. Further, such a long streamer experiences tremendous tension stress that is borne by stress members that parallel the data and command signal conductors. Such a stress member may also be referred to herein as a load bearing cable or rope. It has been found that retrieving a streamer by winding the streamer on a take-up capstan creates uneven stress on stress bearing cable members within a streamer.

In the course of deploying and retrieving a streamer, as well as during underway operations, the streamer may be damaged. A great deal of attention has been paid to developing techniques for quickly and inexpensively repairing damaged streamers, including repairing stress members that are integral parts of the streamers. Splicing of marine streamers until now has been difficult, infrequent, and generally disregarded by the users of marine streamers. Early wire rope stress member sections sometimes used crimped terminations for repair. With the advent and widespread use of light-weight, high-strength synthetic strength members, an appropriate splice method has not been utilized. Until now, no effective means has been found to repair a stress bearing cable of a seismic streamer within replacing the entire cable within a section of the seismic streamer.

In the event that a section of a streamer is damaged, close examination of all stress members is required. If a stress member has more than the allowable number of strands damaged (the number determined by the manufacturer), the section (at least the chassis) has generally been scrapped. The conventional method of chassis manufacture prohibits cost effective stress member replacement.

In order to repair marine streamers used in exploration, a device is required that will allow the repair of damaged areas of stress members by splicing the damaged areas and leaving the undamaged areas of the stress members intact. The region of the repair must have adequate break-strength and must allow for adjusting the splice length in order to equalize load sharing, thereby eliminating non-uniform loads on all of the stress bearing members. Such a splice must attain a high percentage of the stress member rated-break-strength (RBS), both in termination method and mechanical components. The splice should be dependable during all phases of normal operation; i.e., the splice should not back off or part.

Size is another important consideration in repairing a marine seismic streamer load-bearing cable. Given the geometry, weight, and volume constraints of marine streamers, such a splice should be as small as possible in order to reduce intrusion on surrounding components. Further, the splice should be very easy and quick to install, thereby allowing placement of the splice in close quarters. Finally, by minimizing the size of the splice components one also lessens the possibility of snagging the streamer with the installed splice components by handling equipment.

Seismic streamers in use today are commonly filled with a fluid that is carefully chosen to provide a very nearly neutral buoyancy. A device installed within a marine seismic streamer to repair a stress member should therefore produce minimal impact on the buoyancy of the streamer. In so doing, one should select a material that is corrosion proof, and provides low magnetic field disruption.

SUMMARY OF THE INVENTION

The present invention addresses these and other limitations of the prior art by providing cable splice that meets or exceeds the design strength of the cable that it joins, that is low in profile, and that is adjustable in length.

In using this invention, in the event of a damaged stress member, the damaged area is cut out, and the two ends of the stress member of then terminated with one of the component parts of the high efficiency equalizing stress member splice (HEESMS) of this invention. A replacement stress member is terminated with the appropriate HEESMS mate, and installed in the section. After installation, the section is brought up to tension, and the HEESMS adjusted to provide load sharing. The device, after adjusting, provides several mechanisms to effectively lock the splice together.

Various sizes will need to be designed to accommodate a wide range of stress member diameters. Also, initial application is designed for use in oil-filled section, but other, non-oil-filled products can benefit from a similar method of repair and production. Also, alternate socket forms, sizes, and termination materials, will be researched evaluated, and tested, in order to optimize the design for environmental requirements.

These and other features of the present invention will be apparent to those of skill in the art from a review of the following detailed description along with the accompanying drawings.

BRIEF DESCRIPTION OF THE DRAWINGS

FIG. 1a is a side view in partial section of a portion of a seismic cable having a splice of the invention in use, all inside a streamer jacket.

FIG. 1b is a front view of a spacer that holds the strength member of the seismic cable in place.

FIG. 2a is a front view of a capture sleeve that is one of the component parts of this invention.

FIG. 2b is a side section view of capture sleeve of FIG. 2a.

FIG. 3a is a front view of a threaded block that is one of the component parts of this invention.

FIG. 3b is a side section view of the threaded block of FIG. 3a.

FIG. 4a is a front view of a captive block that is one of the component parts of this invention.

FIG. 4b is a side section view of the captive block of FIG. 4a.

DETAILED DESCRIPTION OF A PREFERRED EMBODIMENT

Structure

FIG. 1a discloses the present invention in place after it has been installed. The device comprises a splice 10 joining a first end 12 of strength member and a second end 14 of the strength member. The strength member is preferably a known 12-strand braided Vectran™ rope, although Kevlar™, other aramid fibers, or steel wire is also in use as a strength member in some seismic streamers. The Vectran™ rope exhibits the desired characteristics of very low stretch and creep while it is in use. The strength member may be covered with a sleeve 16 throughout its length, with the exception of the region of the splice 10.

The strength member extends the length of the section of streamer cable, and is periodically supported within a spacer 18. The spacer 18 is shown in FIG. 1a as having one strength member extending through it at an opening 20, but it is understood that two or more strength members generally extend through and are supported by each spacer. For example, another strength member (not shown) extends through an opening 22 through the spacer 18. The spacer also provides an opening 24 to receive signal conductors from a central recorder to components along the streamer and vice versa. The opening 24 is shown in FIG. 1b as having a dumbbell shape, which is preferred to reduce the weight of the spacer, and thus the weight of the streamer, although other configurations for the opening may be used. The splice 10, the strength members, and the spacers, as well as other components not shown, are all contained within a conventional streamer jacket 26, shown in phantom in FIG. 1a.

Also as shown in FIG. 1a, the splice of this invention comprises primarily a capture sleeve 30, shown in greater detail in FIGS. 2a and 2b, a threaded block 32, shown in FIGS. 3a and 3b, and a captive block 34, shown in FIGS. 4a and 4b. The threaded block 32 retains a terminus 36 of the end 12 and the captive block 34 retains a terminus 38 of the end 14 of the strength member. Each terminus 36 and 38 is prepared by feathering or fibrillating the respective terminus, i.e. unraveling the strands of the stress member, and withdrawing the feathered terminus into its respective threaded block 32 or captive block 34 to a point where the terminus is about flush with the end of the block. The feathered stress member is then saturated with an epoxy, polyurethane, or other appropriate material and this material is allowed to cure, thereby producing a solid component comprising the threaded block 32 with its embedded terminus 36 or the captive block 34 with its embedded terminus 38.

It is to be understood that FIG. 1a depicts the terminus 36 and the terminus 38 with a large gap between them for purposes of illustration only. In practice, this gap would be made much smaller while still providing sufficient room for relative movement between the various components of the splice.

FIGS. 2a and 2b depict a preferred structure of the capture sleeve 30. The capture sleeve is the central, bridging member of the splice 10, and couples the threaded block 32 and the captive block 34 together in a spread-apart configuration. As shown in FIG. 2a, the capture sleeve is a cylindrical component oriented about an axis 40 and defines a central bore 42. One end of the capture sleeve includes an opening 44 of a diameter less than that of the central bore 42. The reduced diameter of the opening 44 therefore defines a shoulder 46, which mates with a complementary shoulder 48 (see FIG. 4b) of the captive block 34. The shoulder 46 provides a load bearing retainer where the shoulder 46 abuts the complementary shoulder 48. Each of the shoulder 46 and 48 is also tapered, so that a compressive force is exerted on the captive block 34 to might tightly retain the stress member and to align the captive block within the capture sleeve.

The other end of the capture sleeve 30 includes interior threads 50 to receive mating threads 52 (see FIG. 3b) of the threaded block 32. The interior threads 50 stop at an interior groove 54 for ease of machining. The threads 50 also provide a component locking channel when potted.

A hole 56 is provided to receive a wrench like a spanner wrench to rotate the capture sleeve, as described below. Another hole, 180° around the capture sleeve but not visible in FIG. 2b, is also provided for the wrench. The holes 56 also provide a means for injecting potting material into the interior of the assembly, as well as bleeding air from the splice during final assembly.

FIGS. 3a and 3b depict the threaded block 32. The threaded block is axially oriented about the axis 40, so the threaded block is co-axial with the capture sleeve.

As previously described, the threaded block 32 includes outside threads 52 to which thread onto interior threads 52 of the capture sleeve 30. The inside surface of the threaded block 32 defines a conical section 58 to receive the terminus 36, as shown in FIG. 1a. The threaded block 32 also defines a cylindrical section 60 at the end facing the captive block 34. The other end of the block 32 includes a flange 62 which may abut a spacer 64 (see FIG. 1a) if such a spacer is required. Exterior the flange 62 is a pair of holes 66 which are adapted to receive a wrench for holding the threaded block 32 stationary while the capture sleeve is rotated, thereby mating the three components of the splice together. An opening 68 into the interior of the threaded block defines a round-shouldered mouth 70 to assist in threading the threaded block onto the end 12 of the strength member while providing a smooth, non-obtrusive exit for the stress member.

FIGS. 3a and 3b depict a preferred captive block 34. The captive block is axially oriented about the axis 40, so the threaded block is co-axial with the capture sleeve and the threaded block.

The outside of the captive block 34 is substantially smooth, and of a diameter slightly less than the bore 42 so that the capture sleeve and the captive block slide easily together. As previously described the captive block 34 includes a shoulder 48 to abut with a shoulder 46 on the interior of the capture sleeve. The interior of the captive block includes a conical section 72 to receive the terminus 38, as shown in FIG. 1a. The interior of the captive block also includes a cylindrical section 74. An opening 76 into the interior of the captive block defines a round-shouldered mouth 78 to assist in threading the captive block onto the end 14 of the strength member.

To assemble the splice 10 to the configuration shown in FIG. 1a, one begins with a strength member that has parted or otherwise requires splicing, and the ends 12 and 14 are accessible outside the jacket 26. If the ends 12 and 14 are ragged, they are first trimmed to provide entry into the opening 68 or the opening 76 as appropriate. The sleeve 16 must also be stripped of shucked back a sufficient distance to permit sliding the various components back onto the strength member ends.

Next, the capture sleeve 30 is threaded onto the end 14 and slid back to permit room for the captive block, which is next threaded onto the end 14. With the captive block on the end 14, the terminus 38 is feathered or fibrillated with a comb, so that the strands of the rope are spread apart. The captive block is then slid forward so that the terminus 38 is flush with the cylindrical section 74. The cylindrical section and 74 and the conical section 72 are then filled with the epoxy, which fills in any voids by capillary action. When the epoxy is cured, the capture sleeve is slid forward until the shoulders 46 and 48 are in abutting contact.

The threaded block is prepared in a similar fashion. The threaded block is threaded onto the end 12 and the terminus 36 is feathered, then the terminus 36 is slid down onto the threaded block until the end of the terminus is flush with the cylindrical section 60. The cylindrical section 60 and the conical section 58 are filled with epoxy, which fills in voids by capillary action.

Finally, the threaded block is held stationary using the holes 66 while the capture sleeve is rotated using the holes 56. The capture sleeve is rotated until the desired tension in the strength member is achieved. The spacer 64, if necessary, may be inserted over the threaded block immediately before the threaded block and capture sleeve are mated. Trial assembly of the splice disclosed herein may be necessary in order to determine if a spacer is needed or not.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A cable splice device comprising:
   a. an axially oriented cylindrical capture sleeve defining an interior bore with a threaded section at one end of the sleeve and a reduced diameter opening at the other end of the sleeve;
   b. a captive block adapted to fit coaxially within the capture sleeve, the captive block having a smooth, cylindrical outside diameter less than the interior bore of the capture sleeve, the captive block further having a conical shaped interior bore, the captive block terminating flush with the capture sleeve at the reduced diameter opening; and
   c. a threaded block adapted to fit coaxially within the capture sleeve and having exterior threads to mate with the threaded section of the capture sleeve, the threaded block further having a conical shaped interior bore, the threaded block further defining a flange extending beyond the interior bore of the capture sleeve.

2. The device of claim 1, further comprising a shoulder in the capture sleeve between the interior bore and the reduced diameter opening.

3. The device of claim 2, wherein the capture sleeve shoulder is tapered to abut with a complementary shoulder on the captive block.

4. The device of claim 1, wherein the interior bore of the captive block is adapted to receive a feathered terminus of a strength member.

5. The device of claim 1, wherein the interior bore of the threaded block is adapted to receive a feathered terminus of a strength member.

6. The device of claim 1, wherein the interior bore of the captive block is adapted to receive a first feathered terminus of a strength member, wherein the interior bore of the threaded block is adapted to receive a second feathered terminus of a strength member, and wherein the first and second termini are to be spliced together.

7. The device of claim 1, further comprising a pair of radially opposed holes through the capture sleeve.

8. The device of claim 7, wherein the pair of holes is configured to receive potting material into one of the pair of holes while air is vented from the other of the pair of holes.

9. The device of claim 1, further comprising a pair of drive holes adapted to receive a tool for holding the threaded block stationary while the capture sleeve is rotated.

10. The device of claim 1, further comprising an elongate cylindrical spacer between the capture sleeve and the threaded block.

* * * * *